United States Patent
Chand et al.

(10) Patent No.: US 8,280,537 B2
(45) Date of Patent: *Oct. 2, 2012

(54) EDITING LIFECYCLE AND DEPLOYMENT OF OBJECTS IN AN INDUSTRIAL AUTOMATION ENVIRONMENT

(75) Inventors: Sujeet Chand, Brookfield, WI (US); Stephen C. Briant, Moon Township, PA (US); Kenwood H. Hall, Hudson, OH (US); Gavan W. Hood, Upper Lockyer (AU); John J. Baier, Mentor, OH (US); Michael D. Kalan, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/269,182

(22) Filed: Oct. 7, 2011

(65) Prior Publication Data

US 2012/0029664 A1   Feb. 2, 2012

Related U.S. Application Data

(63) Continuation of application No. 12/478,927, filed on Jun. 5, 2009, now Pat. No. 8,060,223, which is a continuation of application No. 11/238,292, filed on Sep. 29, 2005, now Pat. No. 7,548,789.

(51) Int. Cl.
   *G05B 19/42*  (2006.01)
(52) U.S. Cl. .......................... 700/87; 717/107
(58) Field of Classification Search .................. 700/86, 700/87; 717/101, 102, 107, 110, 170, 173
   See application file for complete search history.

(56) References Cited

U.S. PATENT DOCUMENTS

| | | | |
|---|---|---|---|
| 4,268,901 A | 5/1981 | Subrizi et al. | |
| 4,347,564 A | 8/1982 | Sugano et al. | |
| 4,623,964 A | 11/1986 | Getz et al. | |
| 4,990,838 A | 2/1991 | Kawato et al. | |
| 5,072,374 A | 12/1991 | Sexton et al. | |
| 5,185,708 A | 2/1993 | Hall et al. | |
| 5,253,184 A | 10/1993 | Kleinschnitz | |
| 5,301,320 A | 4/1994 | McAtee et al. | |
| 5,446,868 A | 8/1995 | Gardea et al. | |
| 5,455,775 A | 10/1995 | Huber et al. | |
| 5,485,620 A | 1/1996 | Sadre et al. | |
| 5,504,891 A | 4/1996 | Motoyama et al. | |
| 5,537,585 A | 7/1996 | Blickenstaff et al. | |

(Continued)

OTHER PUBLICATIONS

OA dated Apr. 14, 2008 for U.S. Appl. No. 11/238,292, 37 pages.

(Continued)

*Primary Examiner* — John R. Cottingham
*Assistant Examiner* — Chad Rapp
(74) *Attorney, Agent, or Firm* — Turocy & Watson, LLP; Alexander R. Kuszewski; John M. Miller

(57) ABSTRACT

An editor in an industrial automation environment comprises an input component that receives modification data relating to at least one of lifecycle and deployment of an object, the object is associated with a programmable logic controller and configured in accordance with a hierarchically structured data model. An implementation component can implement the modification data with respect to the object. The editor can further comprise a security component that determines that an entity providing the data to the input component is authorized to implement the modification data.

20 Claims, 12 Drawing Sheets

U.S. PATENT DOCUMENTS

| | | |
|---|---|---|
| 5,572,731 A | 11/1996 | Morel et al. |
| 5,611,059 A | 3/1997 | Benton et al. |
| 5,619,724 A | 4/1997 | Moore |
| 5,634,048 A | 5/1997 | Ryu et al. |
| 5,644,740 A | 7/1997 | Kiuchi |
| 5,675,748 A | 10/1997 | Ross |
| 5,715,413 A | 2/1998 | Ishai et al. |
| 5,721,905 A | 2/1998 | Elixmann et al. |
| 5,761,499 A | 6/1998 | Sondregger |
| 5,797,137 A | 8/1998 | Golshani et al. |
| 5,812,773 A | 9/1998 | Norin |
| 5,828,851 A | 10/1998 | Nixon et al. |
| 5,832,486 A | 11/1998 | Itoh et al. |
| 5,838,563 A | 11/1998 | Dove et al. |
| 5,848,273 A | 12/1998 | Fontana et al. |
| 5,862,052 A | 1/1999 | Nixon et al. |
| 5,884,025 A | 3/1999 | Baehr et al. |
| 5,884,033 A | 3/1999 | Duvall et al. |
| 5,913,029 A | 6/1999 | Shostak |
| 5,924,094 A | 7/1999 | Sutter |
| 5,936,539 A | 8/1999 | Fuchs |
| 5,940,294 A | 8/1999 | Dove |
| 5,940,854 A | 8/1999 | Green, Jr. et al. |
| 5,951,440 A | 9/1999 | Reichlinger |
| 5,960,420 A | 9/1999 | Leymann et al. |
| 5,966,705 A | 10/1999 | Koneru |
| 5,978,577 A | 11/1999 | Rierden et al. |
| 5,980,078 A | 11/1999 | Krivoshein et al. |
| 5,983,016 A | 11/1999 | Brodsky et al. |
| 6,011,899 A | 1/2000 | Ohishi et al. |
| 6,032,208 A | 2/2000 | Nixon et al. |
| 6,044,217 A | 3/2000 | Brealey et al. |
| 6,063,129 A | 5/2000 | Dadd et al. |
| 6,081,899 A | 6/2000 | Byrd |
| 6,098,116 A | 8/2000 | Nixon et al. |
| 6,101,531 A | 8/2000 | Eggleston et al. |
| 6,195,591 B1 | 2/2001 | Nixon et al. |
| 6,208,987 B1 | 3/2001 | Nihei |
| 6,234,899 B1 | 5/2001 | Nulph |
| 6,266,726 B1 | 7/2001 | Nixon et al. |
| 6,275,977 B1 | 8/2001 | Nagai et al. |
| 6,308,168 B1 | 10/2001 | Dovich et al. |
| 6,308,224 B1 | 10/2001 | Leymann et al. |
| 6,311,187 B1 | 10/2001 | Jeyaraman |
| 6,327,511 B1 | 12/2001 | Naismith et al. |
| 6,336,152 B1 | 1/2002 | Richman et al. |
| 6,356,920 B1 | 3/2002 | Vandersluis |
| 6,377,957 B1 | 4/2002 | Jeyaraman |
| 6,393,566 B1 | 5/2002 | Levine |
| 6,398,106 B1 | 6/2002 | Ulvr et al. |
| 6,409,082 B1 | 6/2002 | Davis et al. |
| 6,411,987 B1 | 6/2002 | Steger et al. |
| 6,415,983 B1 | 7/2002 | Ulvr et al. |
| 6,425,051 B1 | 7/2002 | Burton et al. |
| 6,438,744 B2 | 8/2002 | Toutonghi et al. |
| 6,445,963 B1 | 9/2002 | Blevins et al. |
| 6,446,202 B1 | 9/2002 | Krivoshein et al. |
| 6,457,053 B1 | 9/2002 | Satagopan et al. |
| 6,469,986 B1 | 10/2002 | Lecheler et al. |
| 6,473,656 B1 | 10/2002 | Langels et al. |
| 6,484,061 B2 | 11/2002 | Papadopoulos et al. |
| 6,501,996 B1 | 12/2002 | Bieber |
| 6,505,247 B1 | 1/2003 | Steger et al. |
| 6,510,352 B1 | 1/2003 | Badavas et al. |
| 6,539,271 B2 | 3/2003 | Lech et al. |
| 6,539,430 B1 | 3/2003 | Humes |
| 6,539,458 B2 | 3/2003 | Holmberg |
| 6,631,519 B1 | 10/2003 | Nicholson et al. |
| 6,643,555 B1 | 11/2003 | Eller et al. |
| 6,661,426 B1 | 12/2003 | Jetha et al. |
| 6,664,981 B2 | 12/2003 | Ashe et al. |
| 6,681,227 B1 | 1/2004 | Kojima et al. |
| 6,687,817 B1 | 2/2004 | Paul |
| 6,697,797 B1 | 2/2004 | Hoggatt et al. |
| 6,704,746 B2 | 3/2004 | Sokolov et al. |
| 6,714,949 B1 | 3/2004 | Frey, Jr. |
| 6,714,981 B1 | 3/2004 | Skaggs |
| 6,738,821 B1 | 5/2004 | Wilson et al. |
| 6,745,089 B2 | 6/2004 | Rasmussen et al. |
| 6,748,486 B2 | 6/2004 | Burton et al. |
| 6,751,634 B1 | 6/2004 | Judd |
| 6,758,403 B1 | 7/2004 | Keys et al. |
| 6,760,721 B1 | 7/2004 | Chasen et al. |
| 6,760,732 B2 | 7/2004 | Busshart et al. |
| 6,763,395 B1 | 7/2004 | Austin |
| 6,766,312 B2 | 7/2004 | Landt |
| 6,769,095 B1 | 7/2004 | Brassard et al. |
| 6,778,537 B1 | 8/2004 | Ishibashi |
| 6,801,822 B1 | 10/2004 | Fujiwara et al. |
| 6,807,632 B1 | 10/2004 | Carpentier et al. |
| 6,809,732 B2 | 10/2004 | Zatz et al. |
| 6,832,120 B1 | 12/2004 | Frank et al. |
| 6,836,892 B2 | 12/2004 | Ikoma et al. |
| 6,839,790 B2 | 1/2005 | Barros De Almeida et al. |
| 6,842,769 B1 | 1/2005 | Kim et al. |
| 6,853,920 B2 | 2/2005 | Hsiung et al. |
| 6,865,429 B1 | 3/2005 | Schneider et al. |
| 6,865,509 B1 | 3/2005 | Hsiung et al. |
| 6,868,413 B1 | 3/2005 | Grindrod et al. |
| 6,874,145 B1 | 3/2005 | Ye et al. |
| 6,874,146 B1 | 3/2005 | Iyengar |
| 6,880,060 B2 | 4/2005 | Talagala et al. |
| 6,889,282 B2 | 5/2005 | Schollenberger |
| 6,901,578 B1 | 5/2005 | Beaven et al. |
| 6,904,473 B1 | 6/2005 | Bloxham et al. |
| 6,920,474 B2 | 7/2005 | Walsh et al. |
| 6,928,521 B1 | 8/2005 | Burton et al. |
| 6,930,985 B1 | 8/2005 | Rathi et al. |
| 6,934,749 B1 | 8/2005 | Black et al. |
| 6,938,079 B1 | 8/2005 | Anderson et al. |
| 6,944,626 B2 | 9/2005 | Cameron et al. |
| 6,947,947 B2 | 9/2005 | Block et al. |
| 6,950,900 B1 | 9/2005 | McKean et al. |
| 6,954,770 B1 | 10/2005 | Carlson et al. |
| 6,961,728 B2 | 11/2005 | Wynblatt et al. |
| 6,973,556 B2 | 12/2005 | Milligan et al. |
| 6,975,913 B2 | 12/2005 | Kreidler et al. |
| 7,548,789 B2 | 6/2009 | Chand et al. |
| 8,060,223 B2 * | 11/2011 | Chand et al. .................... 700/87 |
| 2002/0012401 A1 | 1/2002 | Karolys et al. |
| 2002/0013748 A1 | 1/2002 | Edmison et al. |
| 2002/0069167 A1 | 6/2002 | Conlow |
| 2002/0073236 A1 | 6/2002 | Helgeson et al. |
| 2002/0087786 A1 | 7/2002 | Burton et al. |
| 2002/0091838 A1 | 7/2002 | Rupp et al. |
| 2002/0103785 A1 | 8/2002 | Harvey |
| 2002/0194577 A1 | 12/2002 | Connor et al. |
| 2003/0014387 A1 | 1/2003 | Kreidler et al. |
| 2003/0065673 A1 | 4/2003 | Grobler et al. |
| 2003/0090514 A1 | 5/2003 | Cole et al. |
| 2003/0120710 A1 | 6/2003 | Pulsipher et al. |
| 2003/0123467 A1 | 7/2003 | Du et al. |
| 2003/0126308 A1 | 7/2003 | Kim |
| 2003/0177114 A1 | 9/2003 | Lin et al. |
| 2003/0212828 A1 | 11/2003 | Miyazaki et al. |
| 2003/0218641 A1 | 11/2003 | Longobardi |
| 2004/0006401 A1 | 1/2004 | Yamada et al. |
| 2004/0024995 A1 | 2/2004 | Swaine |
| 2004/0044421 A1 | 3/2004 | Brune et al. |
| 2004/0073565 A1 | 4/2004 | Kaufman et al. |
| 2004/0098153 A1 | 5/2004 | Neudeck |
| 2004/0167790 A1 | 8/2004 | Grasse |
| 2004/0196855 A1 | 10/2004 | Davies et al. |
| 2004/0199655 A1 | 10/2004 | Davies et al. |
| 2004/0203620 A1 | 10/2004 | Thome et al. |
| 2004/0210629 A1 | 10/2004 | Klindt et al. |
| 2004/0249771 A1 | 12/2004 | Berg et al. |
| 2004/0260591 A1 | 12/2004 | King |
| 2005/0005289 A1 | 1/2005 | Adolph et al. |
| 2005/0044112 A1 | 2/2005 | Yamamoto et al. |
| 2005/0065829 A1 | 3/2005 | Birkhoelzer |
| 2005/0065971 A1 | 3/2005 | Honda |
| 2005/0069853 A1 | 3/2005 | Tyson et al. |
| 2005/0091349 A1 | 4/2005 | Scheibli |
| 2005/0102672 A1 | 5/2005 | Brothers |
| 2005/0107897 A1 | 5/2005 | Callaghan |
| 2005/0108247 A1 | 5/2005 | Heinla et al. |

| | | |
|---|---|---|
| 2005/0120021 A1 | 6/2005 | Tang et al. |
| 2005/0129247 A1 | 6/2005 | Gammel et al. |
| 2005/0135782 A1 | 6/2005 | Ando et al. |
| 2005/0154741 A1 | 7/2005 | Hebert et al. |
| 2005/0166215 A1 | 7/2005 | Holloway et al. |
| 2005/0177687 A1 | 8/2005 | Rao |
| 2005/0187925 A1 | 8/2005 | Schechinger et al. |
| 2005/0198248 A1 | 9/2005 | Morimoto et al. |
| 2005/0216460 A1 | 9/2005 | Yoon et al. |
| 2005/0223010 A1 | 10/2005 | Murray |
| 2005/0251527 A1 | 11/2005 | Phillips et al. |
| 2005/0256788 A1 | 11/2005 | Mukai |
| 2005/0268253 A1 | 12/2005 | Johnson et al. |
| 2005/0278373 A1 | 12/2005 | Corbett et al. |
| 2006/0004475 A1 | 1/2006 | Brackett et al. |
| 2006/0004847 A1 | 1/2006 | Claudatos et al. |

OTHER PUBLICATIONS

OA dated Mar. 2, 2011 for U.S. Appl. No. 12/478,927, 42 pages.

Pitzek et al., Configuration and Management of a Real-Time Smart Transducer Network, 2003 IEEE, 2003, 4 pages.

European Search Report dated Jun. 12, 2005 for European Patent Application Serial No. EP05016793, 3 pages.

John Kubiatowicz, et al. "OceanStore: An Architecture for Global-Scale Persistent Storage" ASPLOS 2000, Cambridge, Massachusetts (2000).

Roy Goldman, et al. "From Semistructured Data to XML: Migrating the Lore Data Model and Query Language" (1999).

* cited by examiner

EDITING LIFECYCLE AND DEPLOYMENT OF OBJECTS IN AN INDUSTRIAL AUTOMATION ENVIRONMENT

CROSS-REFERENCE TO RELATED APPLICATIONS

This application is a continuation of U.S. patent application Ser. No. 12/478,927, filed Jun. 5, 2009, entitled "EDITING LIFECYCLE AND DEPLOYMENT OF OBJECTS IN AN INDUSTRIAL AUTOMATION ENVIRONMENT," which issued as U.S. Pat. No. 8,060,223 on Nov. 15, 2011, and which is a continuation of U.S. patent application Ser. No. 11/238,292, filed Sep. 29, 2005, entitled "EDITING LIFECYCLE AND DEPLOYMENT OF OBJECTS IN AN INDUSTRIAL AUTOMATION ENVIRONMENT," which issued as U.S. Pat. No. 7,548,789 on Jun. 16, 2009, the entireties of which are hereby incorporated by reference.

TECHNICAL FIELD

The claimed subject matter relates to industrial control systems and, more particularly, to configuring lifecycle and deployment data with respect to objects in an industrial automation environment.

BACKGROUND

Due to advances in computing technology, businesses today are able to operate more efficiently when compared to substantially similar businesses only a few years ago. For example, internal networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Also, data from sensors can be delivered to a processing unit relating to system alarms. Thus, a factory automation system can review collected data and automatically and/or semi-automatically schedule maintenance of a device, replacement of a device, and other various procedures that relate to automating a process.

While various advancements have been made with respect to automating an industrial process, utilization and design of controllers has been largely unchanged. In more detail, industrial controllers have been designed to efficiently undertake real-time control. For instance, conventional industrial controllers receive data from sensors and, based upon the received data, control an actuator, drive, or the like. These controllers recognize a source and/or destination of the data by way of a symbol and/or address associated with the source and/or destination. More particularly, industrial controllers include communications ports and/or adaptors, and sensors, actuators, drives, and the like are communicatively coupled to such ports/adaptors. Thus, a controller can recognize device identify when data is received and further deliver control data to an appropriate device.

As can be discerned from the above, data associated with conventional industrial controllers is created, delivered, and/or stored with a flat namespace data structure. In other words, all that can be discerned by reviewing data received and/or output by a controller is an identity of an actuator or sensor and a status thereof. This industrial controller architecture operates efficiently for real-time control of a particular device—however, problems can arise when data from industrial controllers is desired for use by a higher-level system. For example, if data from the controller was desired for use by a scheduling application, individual(s) familiar with the controller must determine which data is desirable, sort the data, package the data in a desired format, and thereafter map such data to the scheduling application. This introduces another layer of software, and thus provides opportunities for confusion in an industrial automation environment. The problem is compounded if several applications wish to utilize similar data. In operation, various controllers output data, package it in a flat namespace structure, and provide it to a network. Each application utilizing the data copies such data to internal memory, sorts the data, organizes the data, and packages the data in a desired format. Accordingly, multiple copies of similar data exist in a plurality of locations, where each copy of the data may be organized and packaged disparately.

Moreover, due to the aforementioned deficiencies associated with conventional controllers, it is currently not possible to provide detailed information to a controller regarding lifecycle and/or deployment of data. Rather, data generated by the controller is provided to a network, and then the data is consumed by applications that may utilize such data. The applications then peruse the data and have software associated therewith that is utilized to determine whether such data is needed, what the lifecycle is with respect to the data, and the like. This determination is made with respect to each application, thus creating inefficiency and affecting network speed.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Systems, methodologies, and apparatuses are described herein that enable state-based control to occur in an industrial automation environment, wherein a data model associated with the industrial automation environment is a hierarchically structured data model. Accordingly, a unified data model can be provided and implemented within an industrial automation environment. An editor can be provided that enables creation and/or modification of an object that facilitates state-based control. For example, the object can include one or more of deployment data and lifecycle data. In more detail, deployment data can include an action and/or an event, wherein occurrence of the event causes the object to be deployed and a controller to undertake the action. Similarly, the lifecycle data can include defined lifecycle states, actions according to the states, and other suitable lifecycle data. Thus, the lifecycle data can relate to state-based control as well as de-commissioning and archival of the object. Furthermore, lifecycle data can be associated with a version of an object being deployed. Thus, a first version of an object may be associated with a disparate lifecycle than a second version of the same object. Moreover, deployment of lifecycles with respect to data an object can span multiple system domains including software, process configurations, software configurations, and physical devices.

The editor can be associated with a security component that ensures that an initiator of a request to modify/create the object is authorized to implement such request. For example, a security server can be communicatively coupled to the editor and/or a security component can be positioned within the editor. The security component can request identifying indicia from the entity initiating a modification/creation, wherein the identifying indicia can be a username, password, personal identification number, biometric indicia, a MAC address, or any other suitable identifying indicia. Thereafter, the security component can determine whether the initiator is authorized to modify/create the object. The editor can further be associated with a bridging component that is utilized to bridge disparate networks. For example, a programmable logic controller may receive/deliver data over a first network, and the editor may receive/deliver data over a second network. The bridging component enables the programmable logic controller and the editor to seamlessly exchange data therebetween.

A programmable logic controller that facilitates state-based control is also described herein. The programmable logic controller can include a data storage unit that can retain one or more objects that facilitate state-based control. The programmable logic controller can also include a processor for implementing state-based control as defined by the one or more objects. The object retained within the programmable logic controller can include deployment data and lifecycle data, wherein such data relates to deployment and lifecycle states of the object. Thus, depending upon state of a process, the programmable logic controller can execute disparate control modules. The programmable logic controller can further include an event recognizer component that recognizes state changes in a process. Based upon such recognition, the object can be deployed or placed in a disparate state. The programmable logic controller can further include a state machine to assist in implementing state-based control.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
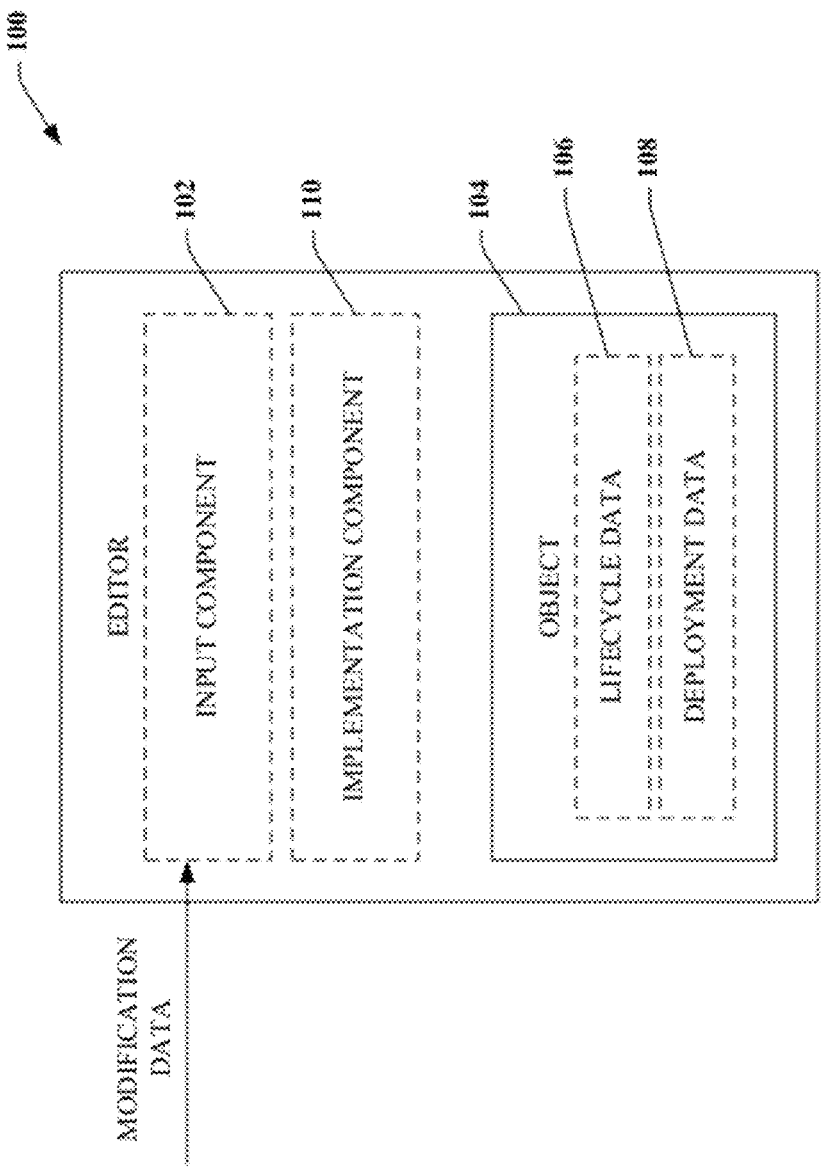
FIG. 1 is a high-level system block diagram of an editor that can be employed to enable state-based control in an industrial automation environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Turning now to the drawings, FIG. 1 illustrates an editor 100 that can be employed to create, configure, and/or modify objects for use in an industrial automation environment. In more detail, the objects can be directly implemented and utilized by programmable logic controllers, which are small computing devices used for automation of real-world processes, such as control of machinery on factory assembly lines. Where older automated systems would use hundreds or thousands of relays and cam timers, a single programmable logic controller can be programmed as a replacement. A programmable logic controller can include input/output circuitry that can monitor status of field connected sensor inputs and control attached devices (motor starters, solenoids, pilot lights/displays, speed drives, valves, . . . ) according to a user-created program stored in memory. Conventionally, programmable logic controllers are programmed by way of ladder logic, and are solely designed for real-time control. Technology, business trends, and advanced control applications, however, are pushing programmable logic controllers so that they are not simply sequential, real-time control devices, but are robust controllers capable of having knowledge of current processes being controlled as well as states of such processes.

The editor 100 operates in accordance with the development of programmable logic controllers. In more detail, the editor 100 includes an input component 102 that receives modification data relating to an object 104, wherein the object 104 conforms to a hierarchically structured data model. For example, through utilization of a hierarchically structured data model, a common data representation can be generated and maintained throughout an enterprise. Therefore, rather than forcing programming of an industrial logic controller (and thus automation of a system/process) to occur in a "bottom-up" manner, programming can be completed offline and accomplished in a "top-down" manner. In more detail, to program conventional programmable logic controllers, tags for inputs and outputs must first be named and defined within the controller. Thereafter, a program can be implemented in the controller using the defined tag names. It is often imperative that each tag be named uniquely throughout a factory or enterprise, as troubleshooting and auditing can be problematic when identical tags exist. Conventional programmable logic controllers are associated with a flat namespace, however, causing maintenance of uniqueness between tag names to be tedious and difficult.

Implementing a hierarchically structured data model and associating such data model with programmable logic controllers alleviates many of the aforementioned deficiencies. For example, a hierarchically structured data model enables implementation and support of a nested namespace. Accordingly, configuration and programming of a programmable logic controller can be accomplished in a "top-down" manner without fear of duplicate tag names, as location within a hierarchy of the programmable logic controller, a process, and/or a system will require uniqueness. Furthermore, programmable logic controllers can be configured/programmed offline, as tags can be named generically and programs can be written offline using such generic tag names. As described above, location of the programmable logic controller within a plant hierarchy can cause such generic tag names to remain unique.

As described above, today's programmable logic controllers are serial in nature, receiving input and providing output according to a pre-defined sequence. The editor 100 facilitates creation/modification of objects that include lifecycle and deployment information. Accordingly, a programmable logic controller implementing such objects can include state engines and/or be communicatively coupled to a proxy that monitors state of a process. As indicated supra, the input component 102 receives modification data relating to the object 104, wherein the modification data relates to one of lifecycle data 106 and deployment data 108 associated with the object 104. For instance, the object 104 can be deployed in disparate manners depending upon a state of a process. In another example, the object 104 can be stored within a programmable logic controller and be deployed upon occurrence of a specified event. In still another example, a state or event can cause the object 104 to be de-commissioned and/or archived, wherein such event and actions are included within the lifecycle data 106. In still another example, the lifecycle data 106 can trigger work flows that represent multiple steps that must be satisfied prior to transitioning to a subsequent lifecycle state. Thus, it can be understood that any suitable lifecycle state and action can be defined and implemented within the object 104.

An implementation component 110 is communicatively coupled to the input component 102 and implements the modification data with respect to the object 104. For example, the modification data can relate to creation of the object 104, and the implementation component 110 can facilitate such creation. Furthermore, the modification data can relate to editing an existing object. For instance, the modification data can be associated with editing the lifecycle data 106 and/or the deployment data 108. The implementation component 110 can implement such changes with respect to the object 104. In one particular example, the editor 100 can receive an indication that an object is desirably modified (at the input component 102). Thereafter, the implementation component 110 can locate the object 104 (if it had previously been deployed) and copy the object into memory (not shown) associated with the editor 100. Thereafter, the modification data can be implemented by the implementation component 110.

As described previously, the object 104 includes lifecycle data 106 and deployment data 108, wherein lifecycle states can be defined by way of the editor 100. Furthermore, the object 104 can be designed in accordance with a hierarchically structured data model. For example, the hierarchically structured data model can be modeled after ISA S95, ISA S88, and/or a combination thereof. In a detailed example, the object 104 can be deployed upon occurrence of an event within a process (e.g., an alarm, completion of a process, . . . ). The object 104 can then operate according to state of a process, machine, or the like, as defined in the lifecycle data 106. For instance, a particular state of a process can cause the object 104 to enter into a particular lifecycle state (as defined in the lifecycle data 106). The state-based architecture facilitates continuity of a process, as it is more flexible and robust than sequential architectures.

Figure 2:
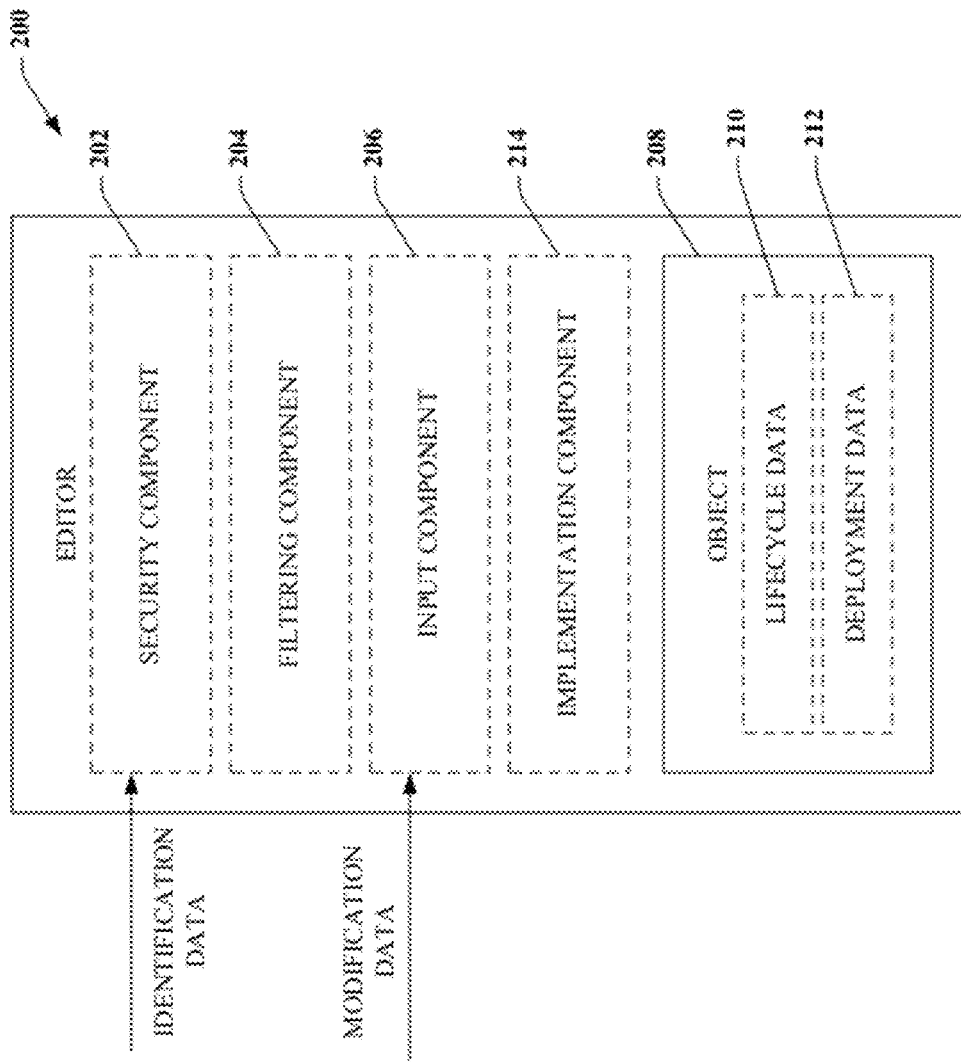
FIG. 2 is a system block diagram illustrating an editor that is utilized to facilitate object creation/modification in a hierarchically structured data model.

Referring now to FIG. 2, an editor 200 that can be employed to create/modify objects for utilization in an industrial automation environment is illustrated. The objects created/modified by the editor 200 can be state-based objects and conform to a hierarchically structured data model. The editor 200 can include a security component 202 that ensures that only authorized users can create and/or modify objects. For instance, the security component 202 can facilitate request of identification data, such as usernames, passwords, PINs, biometric indicia, and the like from a user desiring to create or modify one or more objects. Further, the security component 202 can provide different access levels to disparate users and different portions of objects. For example, a user may have read only access to deployment data associated with an object, read-write access to lifecycle data associated with the object, etc. These different security levels can be enforced by the security component 202. Furthermore, the security component 202 can be employed to generate log files so that modification of objects can be reviewed. Moreover, the security component 202 can access such log files to ensure that objects have not been subject to tampering. In still another example, the security component 202 can ensure that the editor 200 is associated with sufficient physical resources to enable creation of an object. For instance, the security component 202 can determine that the editor 200 is not associated with a power source, and inform an operator of such lack of power. In another example, the security component 202 can determine that the editor 200 is associated with insufficient memory to support creation of an object. Still further, the security component 202 can consider an entity/user's context, such as entity/user's role (operator, technician, electrician, . . . ), an entity/user's scenario (routine maintenance, plant diagnostics, . . . ), and such context can be input to the security component 202 and employed to manage access to the editor 200. Further, the security component 202 can account for configuration of the editor 200 as well as connected devices.

The security component 202 can also operate in conjunction with a filtering component 204 that can filter data based upon user identity, user location, or any other suitable parameter. For instance, the editor 200 can be coupled to a directory structure (not shown), and an operator can request data or an object through the directory by way of the editor. The filtering component 204 can filter objects and data so that only information pertinent to an operator's identity/current task is returned to the operator. The editor 200 further includes an input component 206 that receives modification data relating to a state-based object 208. The input component 206 can passively receive the data and/or actively solicit the modification data. The modification data can relate to one or more of lifecycle data 210 associated with the object 208 and deployment data 212 related to the object 208. The object 208 can be incorporated in connection with a programmable logic controller that supports the state-based object 208 as well as the hierarchically structured data model. With respect to the lifecycle data 210 and the deployment data 212, disparate services/actions can be provided by the object 208 depending on current state and/or previous state. Furthermore, commissioning and removal of the object 208 can be described within the lifecycle data 210.

The input component 206 can be communicatively coupled to an implementation component 214 that implements the modification data with respect to the object 208. For instance, the implementation component 214 can provide a template for creation of an object and/or locate an existing object from a disparate location and copy such object 208 locally in memory (not shown). Thereafter the implementation component 214 can implement the modification data with respect to the object 208 and deliver the object 208 to an appropriate location (e.g., programmable logic controller) within an industrial automation environment. Furthermore, the implementation component 214 can act as a compiler. For example, the modification data can be received in a programming language such as C, C+, C++, or the like, and the implementation component 214 can compile such code prior to commissioning the object 208.

Figure 3:
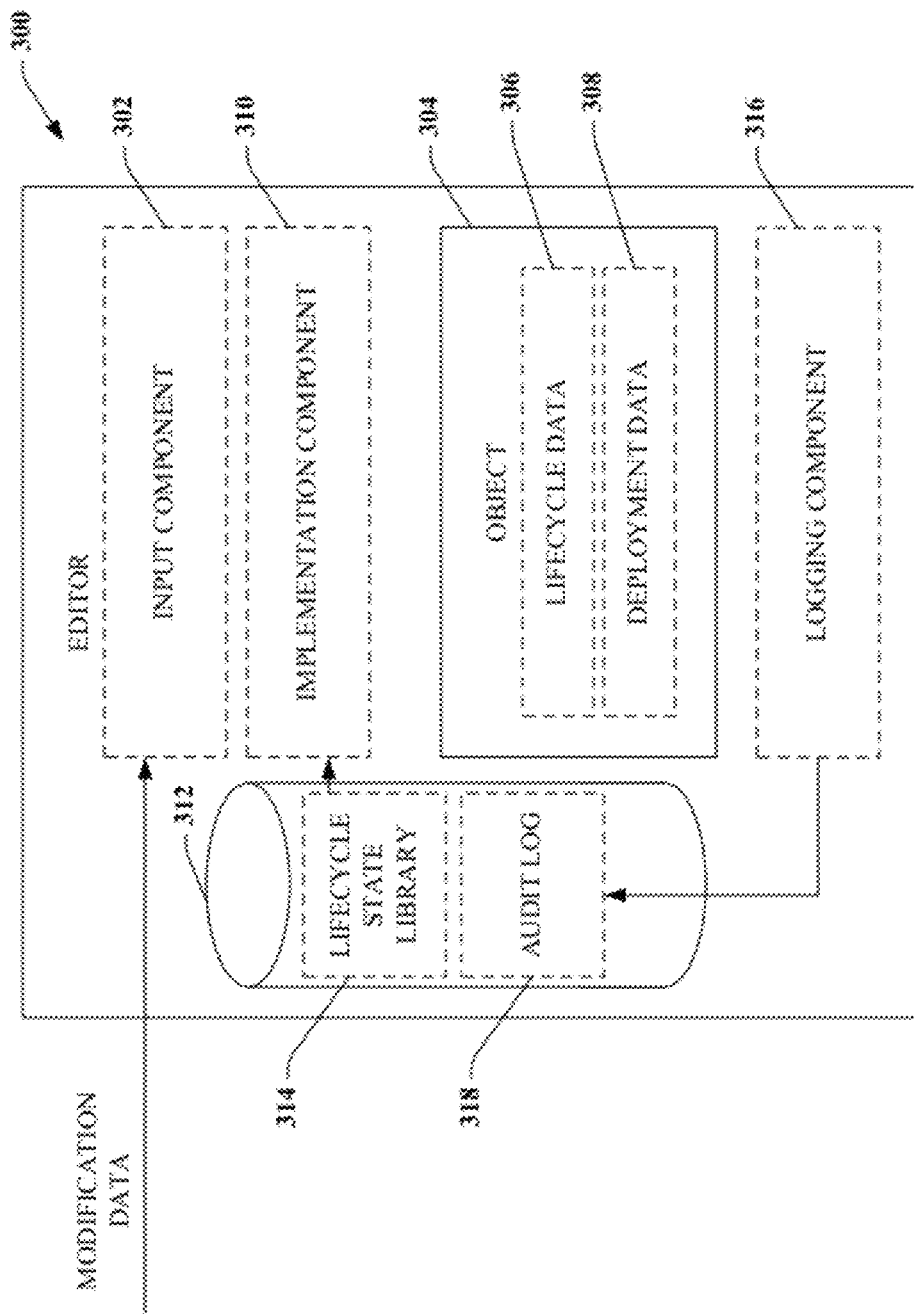
FIG. 3 illustrates an editor that is associated with a lifecycle state library that can be employed to define lifecycle states of an object.

Referring now to FIG. 3, an editor 300 that can be employed to modify/create state-based objects for utilization in an industrial automation environment is illustrated. The editor 300 includes an input component 302 that receives modification data relating to an object 304, wherein the object 304 is a state-based object that conforms to a hierarchically structured data model. The object 304 includes lifecycle data 306 and deployment data 308, wherein such data can include defined events and services associated with the events. For example, the deployment data 308 can include an event that causes the object 304 to be deployed as well as actions to be undertaken in connection with deployment of the object 304. The lifecycle data 306 can include various states in a lifecycle of the object 304 as well as events that cause transition between states.

The editor 300 further includes an implementation component 310 that is communicatively coupled to the input component 302, the implementation component 310 causes the modification data to be implemented with respect to the object 304. The implementation component 310 can further be coupled to a data store 312 that can be internal to or external from the editor 300. For example, the data store 312 can be located on a server and accessed by way of an intranet or the Internet. The data store includes a lifecycle state library 314, which can comprise of various pre-defined lifecycle states and common applications/actions associated with such states. Thus, a user can quickly peruse lifecycle states within the lifecycle state library 314 in connection with creating or modifying the object 304.

The editor 300 can further comprise a logging component 316 that monitors and logs actions undertaken by the editor 300. In more detail, the logging component 316 can track times, users, and modifications made to objects. If problems exist with respect to a modified/created object, a log file 318 can be analyzed to enable rollback. Furthermore, validation of edits of objects and creation of objects is made more efficient, as one can quickly review the log file 318 and determine whether a modification and creation of an object is valid/authorized. Moreover, deployment of objects can cause the logging component 318 to generate audit trails that correlate versions of deployed objects to original source instances. This enables efficient location of multiple versions of objects.

Figure 4:
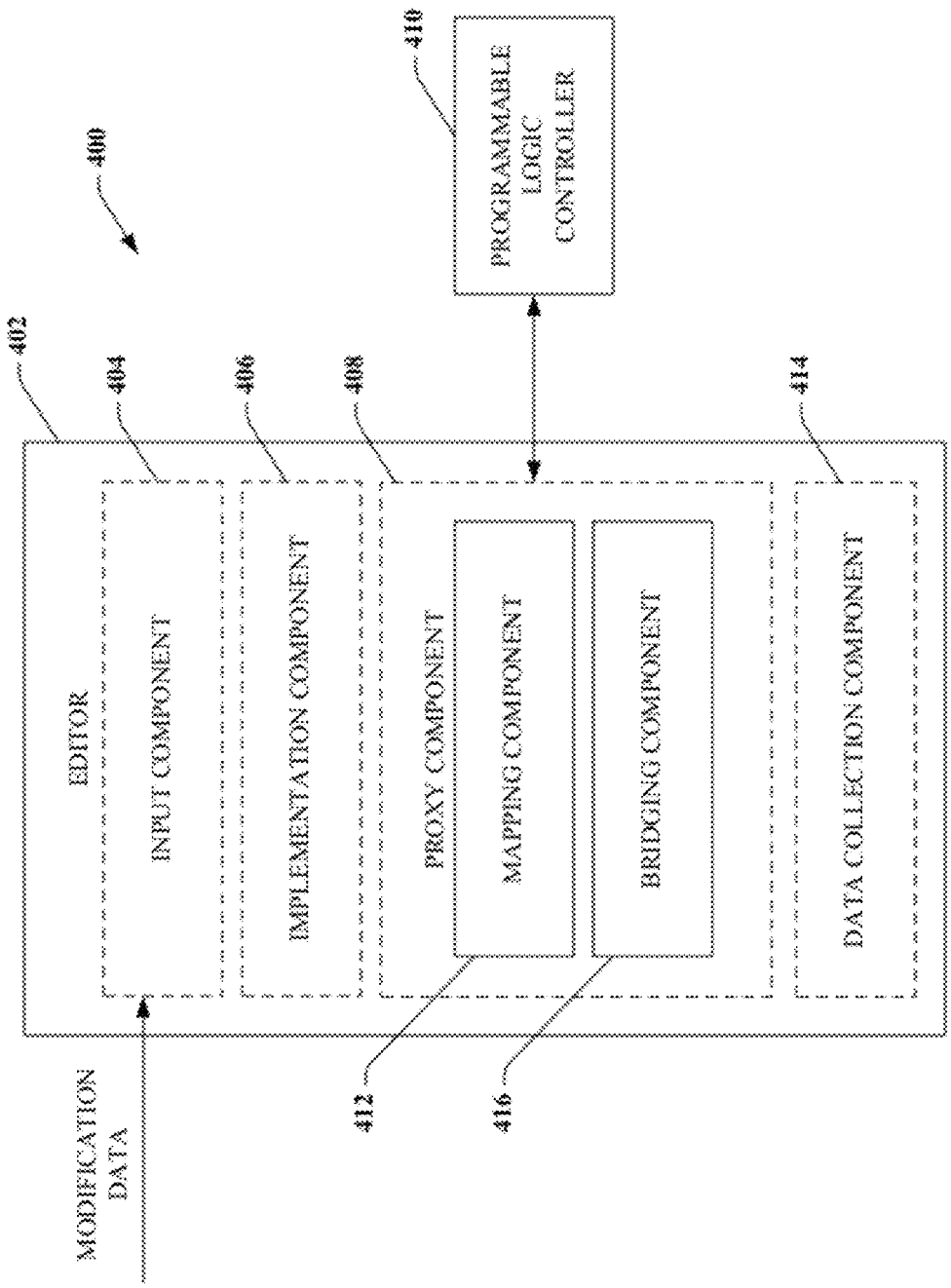
FIG. 4 illustrates an editor that can be employed to implement objects designed in accordance with a hierarchically structured data model with legacy devices.

Referring now to FIG. 4, a system 400 that facilitates state-based control in an industrial automation environment is illustrated. The system 400 includes an editor 400 that can be utilized to edit/create a state-based object. The editor 400 comprises an input component 404 that receives modification data, the modification data is directed towards editing/creating a state-based object that conforms to a hierarchically structured data model. The input component 404 is communicatively coupled to an implementation component 406 that implements the modification data with respect to an object (not shown). For example, the modification data can relate to one or more of lifecycle and deployment of the object.

The editor 400 can further include or be associated with a proxy component 408 that is utilized to map instructions to devices that do not support the hierarchically structured data model and/or state-based control. For example, the proxy component 408 can be communicatively coupled to a programmable logic controller 410 that does not support state-based control and/or a hierarchically structured data model. The programmable logic controller 410 can be a legacy device and/or a third party device that does not include hardware that supports state-based control. Furthermore, the programmable logic controller 410 can communicate over a network protocol that is disparate from that utilized by the editor 402 and/or other industrial automation devices within an enterprise. The proxy component 408, however, can be utilized to render the programmable logic controller 410 so that it conforms to state-based control as well as to the hierarchically structured data model.

In still further detail, the proxy component 408 can include a mapping component 412 that maps a state-based object to a program that can be employed by a programmable logic controller 410. For example, the mapping component 412 can cause the programmable logic controller 410 to be first loaded with a deployment/commissioning program. A data collection component 414 can then receive data indicative of a state change, and the mapping component 412 can then deliver an updated program to the programmable logic controller 410. In another example, if the programmable logic controller 410 includes sufficient memory to retain multiple programs that operate in a particular manner depending upon a pre-defined state, then such programs can be stored in the programmable logic controller 414. The data collection component 414 can then relay an indication of state change to the programmable logic controller 410, and such controller 410 can load and run a particular program associated with the state. In still another example, mapping of information associated with deployment of an object can be reversible—that is, the deployment sequence can be reversed to generate generic representations of objects from deployed instances.

The proxy component 408 can further include a bridging component 416 that enables data transmission between disparate networks. For instance, the editor 402 can lie within a first network and the programmable logic controller 410 can reside within a disparate network. The bridging component 416 can recognize data packaged with respect to a first communications network and re-package such data so that it can be transmitted by way of a second communications network. In a more detailed example, the editor 402 can send/receive data in accordance with the Common Industrial Protocol (CIP), and the programmable logic controller can send/receive data through ProfiBus. The implementation component 406 can be utilized to create a program to be implemented by the programmable logic controller 410 and packaged according to CIP. The bridging component 416 can recognize that the program is packaged according to CIP, and repackage such data so that it can be transmitted by way of ProfiBus. The mapping component 412 can then alter the data so that it is in a format that can be implemented by the programmable logic controller 410. Thus, the proxy component 408 facilitates provision of a common data model as well as state-based control throughout an industrial automation environment, regardless of whether each device therein can implement state-based control and/or a hierarchically structured data model.

Figure 5:
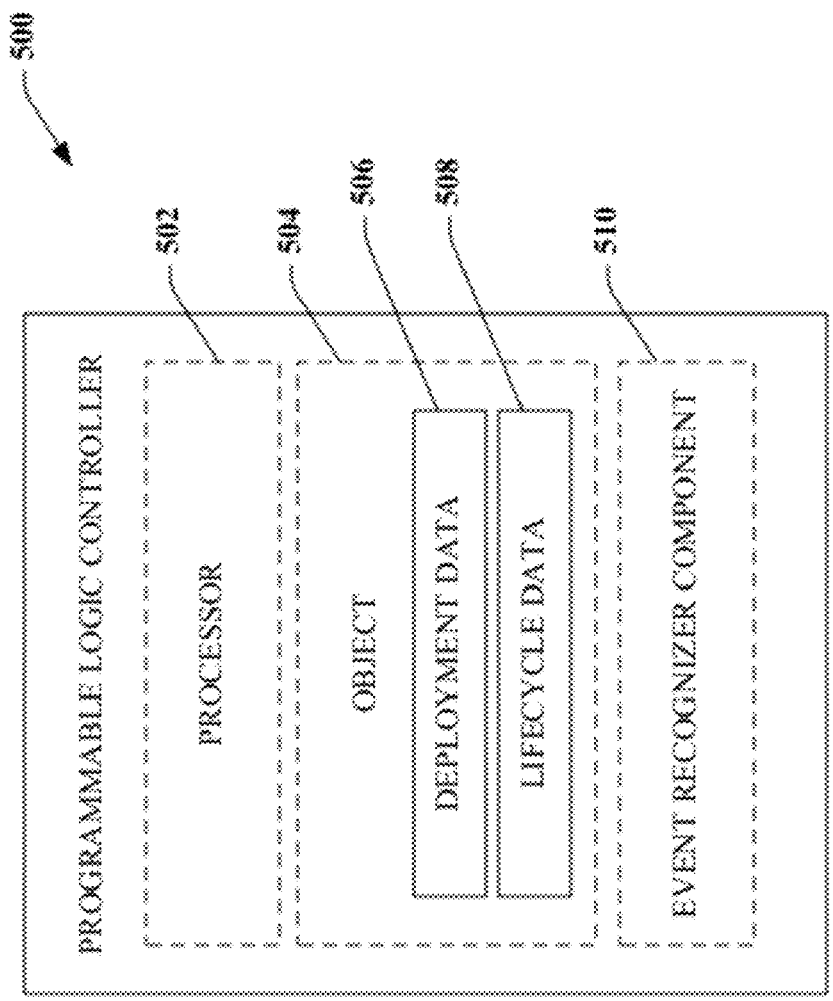
FIG. 5 illustrates a programmable logic controller that can be utilized in connection with state-based control.

Now referring to FIG. 5, a programmable logic controller 500 that can be utilized in connection with state-based control of a process is illustrated. The programmable logic controller 500 includes a processor 502 for processing data as it enters the programmable logic controller 500 and for processing state-based objects. The processor can further include memory (not shown) that comprises an object 504, the object 504 is a state-based object that includes deployment data 506 and lifecycle data 508, where such data relates to deployment functionality and lifecycle states of the object 504. The object 504 can be further designed in accordance with a hierarchically structured data model (which can be implemented/understood by the programmable logic controller 500). For instance, the programmable logic controller 500 can be associated with at least a portion of a schema that supports the hierarchically structured data model. The processor 502 can implement (deploy) the object 504 based upon information within the deployment data 506, thereafter operate according to state and information associated with the lifecycle data 508. The programmable logic controller 500 can further include an event recognizer component 510 that can recognize alterations in states of a process. For example, the event recognizer component 510 can recognize a change of state of a process controlled by the programmable logic controller 500. This change of state can be relayed to the processor 502, which can in turn access the lifecycle data 508 within the object 504.

Figure 6:
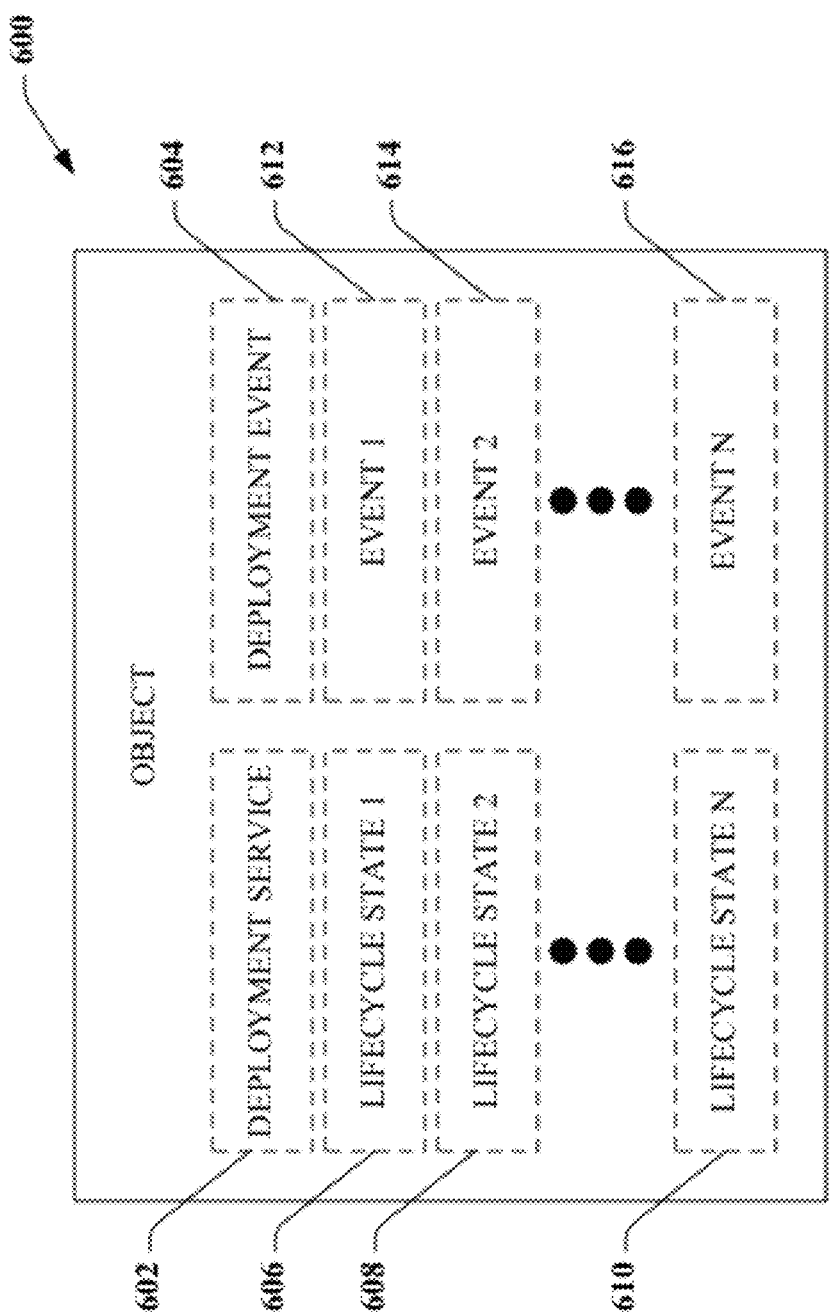
FIG. 6 illustrates an object that can be employed to effectuate state-based control.

Turning now to FIG. 6, an object 600 that can be utilized in a state-based control environment is illustrated. The object 600 can, for instance, be designed to conform to a hierarchically structured data model. The object 600 includes a deployment service 602 that is associated with a deployment event 604. Thus, when the deployment event 604 is detected, the deployment service can be undertaken. The object 600 further includes various lifecycle states 606-610 that are associated with events 612-616. For instance, occurrence of event 2 (614) causes the object 600 to implement lifecycle state 2 (608). Thereafter, occurrence of event 1 (612) can cause the object 600 to implement lifecycle state 1 (606). Thus, the object 600 can be implemented in a programmable logic controller and enable state-based control.

Figure 7:
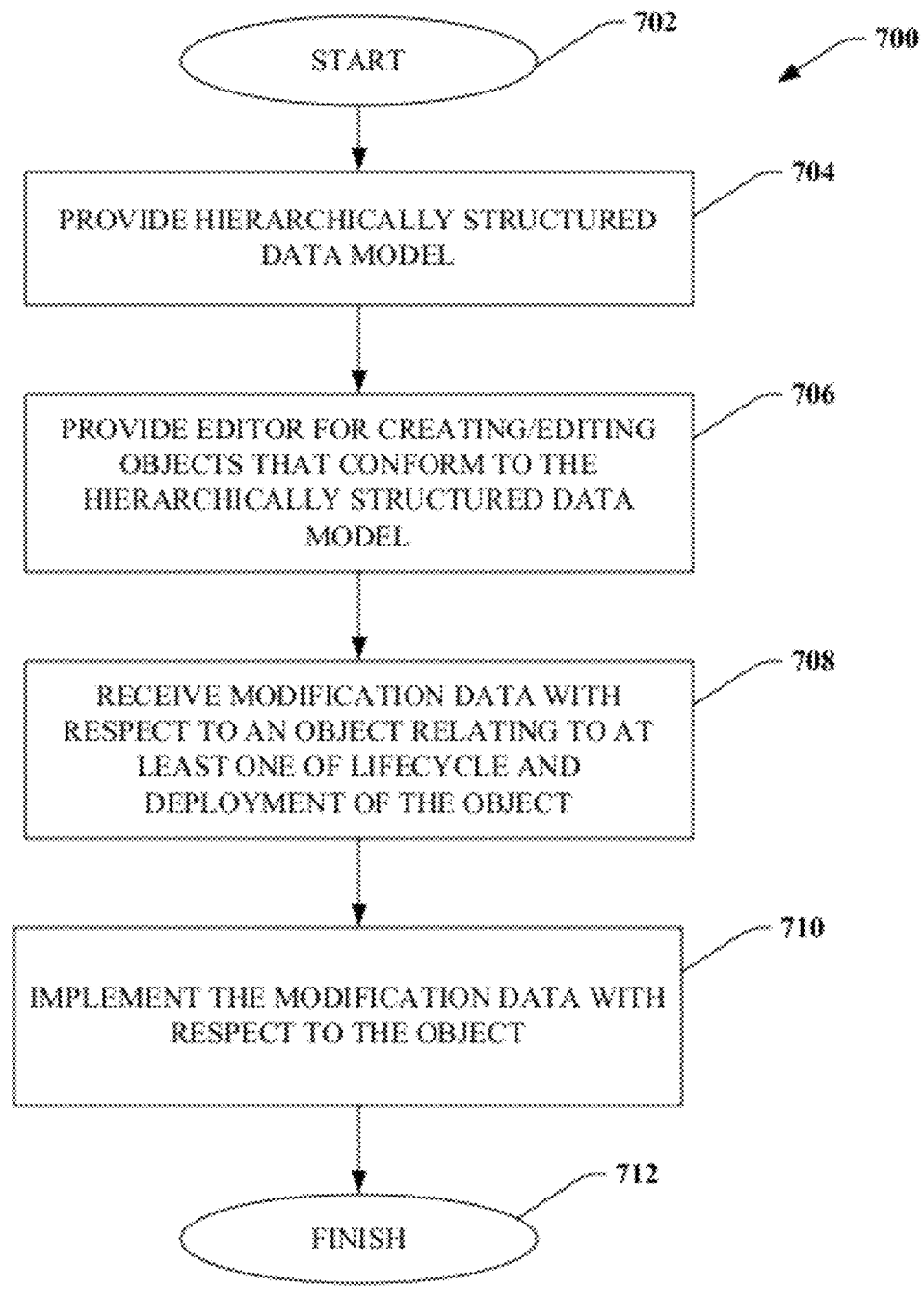
FIG. 7 is a representative flow diagram of a methodology for implementing a state-based object in an industrial automation environment.
Figure 8:
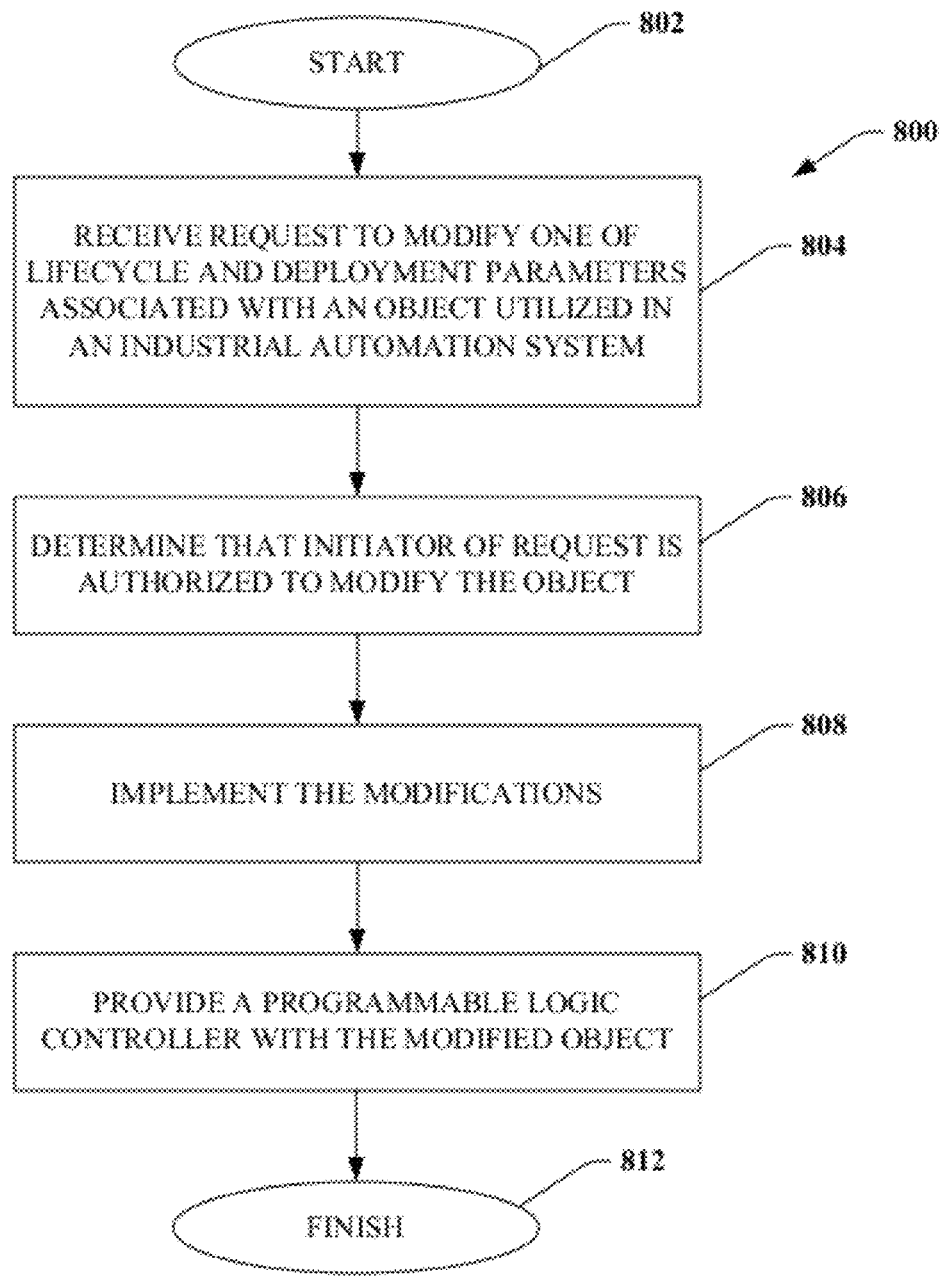
FIG. 8 is a representative flow diagram of a methodology for ensuring that an initiator of a modification/creation request is authorized to implement such request.
Figure 9:
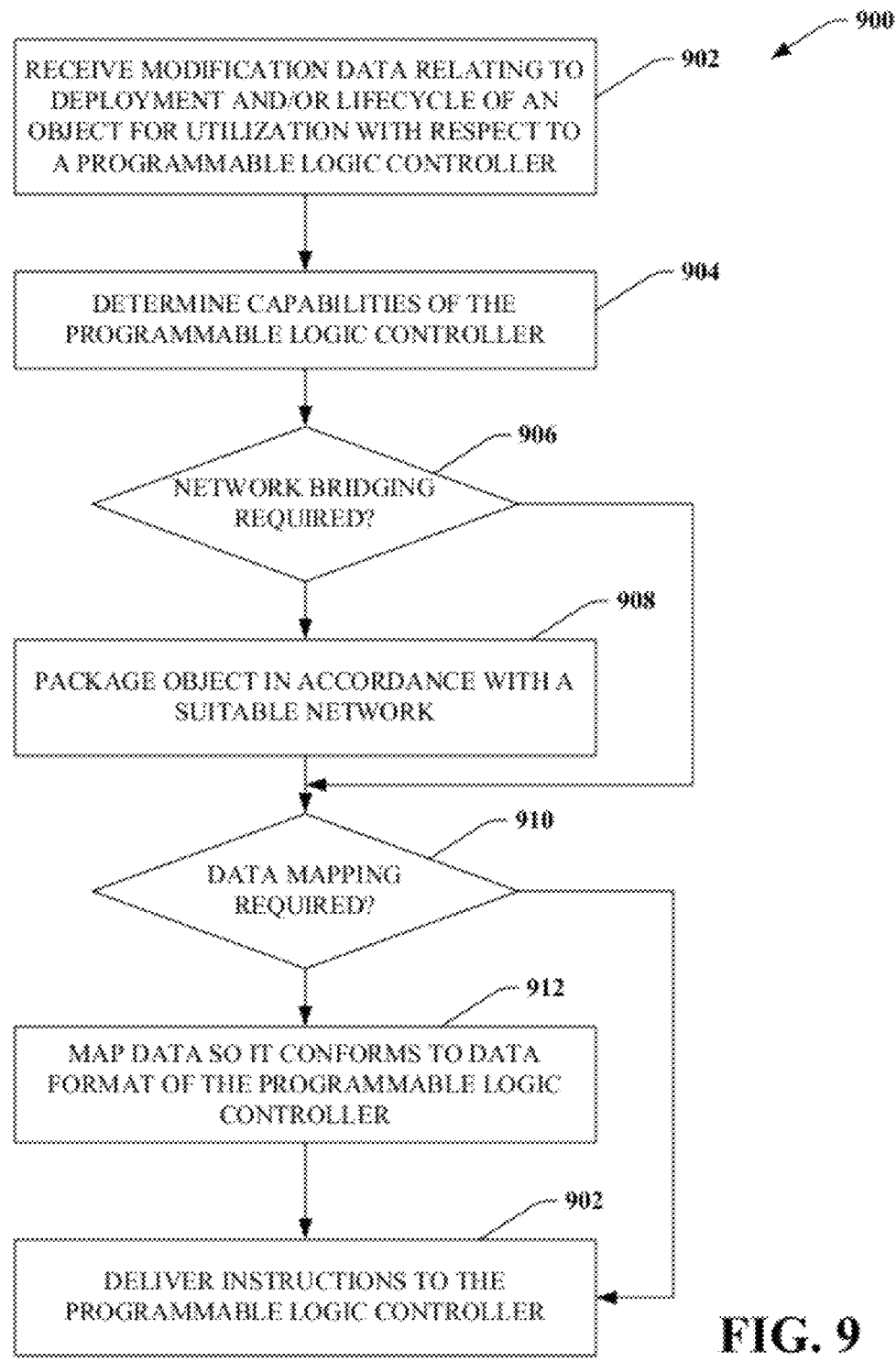
FIG. 9 is a representative flow diagram of a methodology for enabling legacy devices to utilize state-based control.

Referring to FIGS. 7-9, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning specifically to FIG. 7, a methodology 700 for implementing state-based control within an industrial automation environment that employs a hierarchically structured data model is illustrated. The methodology 700 begins at 702, and at 704 a hierarchically structured data model is provided. For example, the hierarchically structured data model can be based at least in part upon ISA S95, ISA S88, and/or a combination thereof. Furthermore, the data model can support nested objects as well as a tiered namespace. At 706, an editor is provided that can be utilized to create/edit objects that conform to the hierarchically structured data model. For example, objects can be created that are for utilization by a programmable logic controller in connection with controlling one or more industrial processes. At 708, modification data is received with respect to an object, wherein the modification data relates to at least one of lifecycle states and deployment of the object. Thus, the data can relate to control actions that are associated with a state of a process. Furthermore, the lifecycle states can include archiving—thus, upon existence of a particular state, the software object will be archived. At 710, the modification data is implemented with respect to the object, and the methodology 700 completes at 712.

Now turning to FIG. 8, a methodology 800 for providing a state-based object to a programmable logic controller is illustrated. The methodology 800 begins at 802, and at 804 a request to modify one of lifecycle and deployment parameters associated with an object is received, wherein the object is utilized in an industrial automation system. Furthermore, the object can be designed in accordance with a hierarchically structured data model, such as one that is based at least in part upon ISA S95, ISA S88, and/or a combination thereof. It is understood, however, that any suitable hierarchically structured can be employed in connection with the object. At 806, determine that an initiator of the request is authorized to modify the object. For instance, a username, password, personal identification number, biometric indicia, or any other suitable data can be requested and analyzed in connection with determining that the initiator is authorized. Furthermore, it can be determined that the initiator can access a certain portion of the object. For example, the initiator may be authorized to modify deployment data associated with the object but not authorized to modify lifecycle data related to the object. At 808, the modifications are implemented, and at 810 a programmable logic controller is provided with the modified object. Thus, a programmable logic controller that can implement an object designed in accordance with a hierarchically structured data model can be utilized for state-based control. The methodology 800 completes at 812.

Referring now to FIG. 9, a methodology 900 for implementing state-based control in a legacy automation device is illustrated. For example, a legacy programmable logic controller may not support a hierarchically structured data model and/or state-based control. It is not desirable, however, to simultaneously replace all legacy devices within an industrial automation environment, as to do so would be extremely costly. The methodology 900 is aimed at enabling state-based control even though some devices will not support such control. At 902, modification data relating to deployment and/or lifecycle of an object is received, wherein such data is desirably employed in connection with a programmable logic controller. For instance, the lifecycle data can be related to a manner in which the controller will operate given a particular state of a process. In another example, the deployment data can describe a time/state that causes deployment of such object.

At 904, capabilities of a programmable logic controller are determined. For instance, whether the controller can implement state-based control, a network over which the programmable logic controller communicates, processing capabilities of the programmable logic controller, memory available within the programmable logic controller, or any other suitable parameter. These determinations can be made through generating inquiries that are delivered to the programmable logic controller, analyzing a table of parameters associated with the programmable logic controller, or any other suitable means for determining the parameters. At 906 a determination is made regarding whether network bridging is required. For example, an editor may communicate over a first network, and the programmable logic controller may send/receive data over a second network. If network bridging is required, a state-based object relating to the modification data is packaged in accordance with a suitable network at 908. Thus, data/objects can be communicated between disparate devices that communicate over different networks.

If no network bridging is required or after the bridging is completed, at 910 a determination is made regarding whether data mapping is required. For example, a data model of a software object may not be supported by the programmable logic controller. In still more detail, the object can be created in accordance with a hierarchically structured data model, thereby enabling nested namespaces and functions. Many legacy programmable logic controllers, however, have a flat namespace, and thus do not support an object that is designed in accordance with a hierarchically structured data model. If data mapping is required, at 912 data is mapped so it conforms to a data format of the programmable logic controller. This can be accomplished through templates, for example. If no data mapping is required or after the data is mapped at 912, instructions are delivered to the programmable logic controller at 914. Furthermore, these instructions can be delivered upon change of state. In other words, the programmable logic controller may only support a single program associated with a particular state. Upon a change of state, a new program can be automatically delivered to the programmable logic controller.

Figure 10:
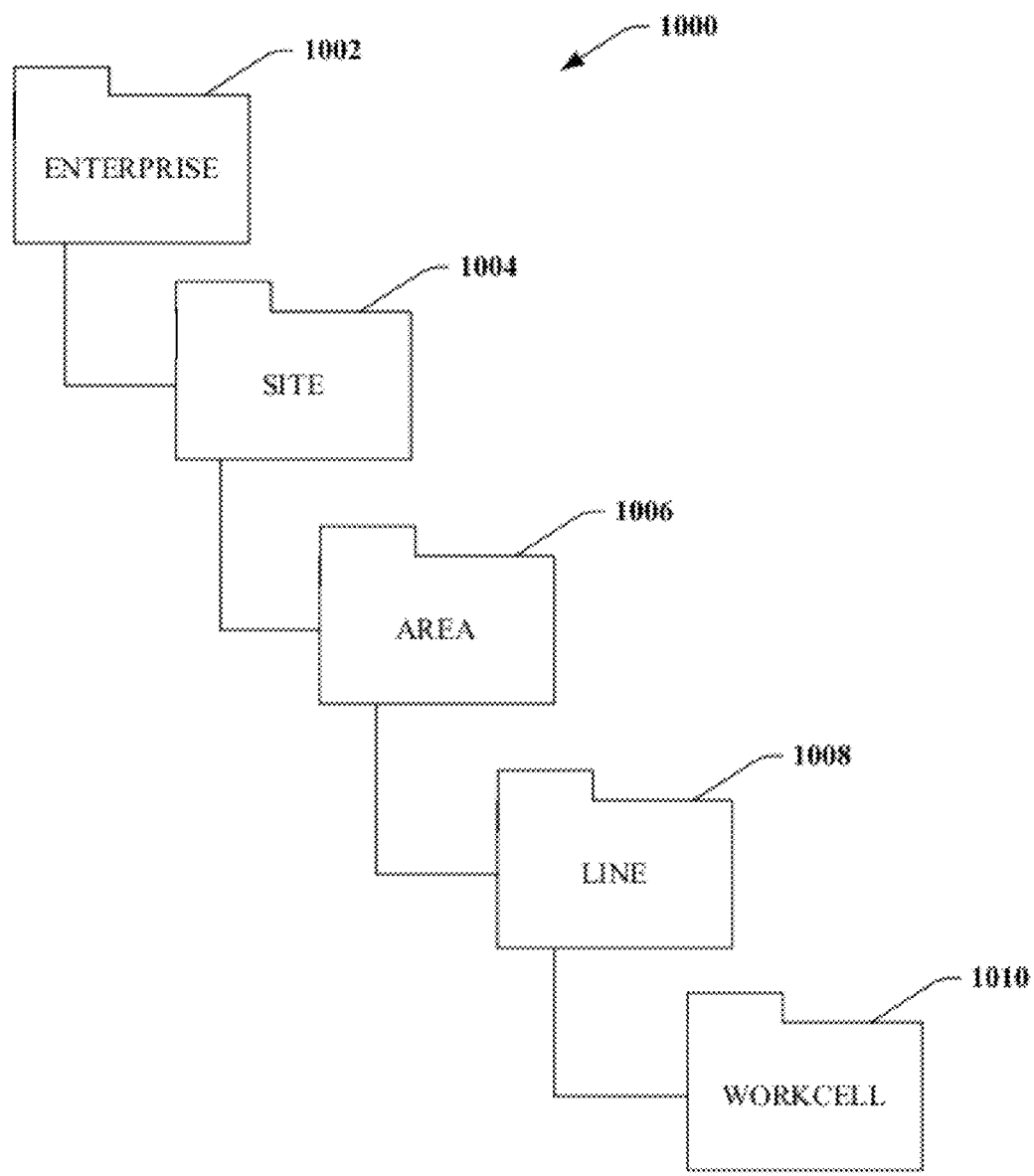
FIG. 10 is a visual representation of an exemplary structure upon which the hierarchically structured data model can be based.

Referring now to FIG. 10, an exemplary hierarchical structure 1000 which can be utilized in connection with the hierarchically structured data model described herein is illustrated. For example, the data model can facilitate nested structures, thereby mitigating deficiencies associated with data models that employ flat namespaces. The structure 1000 includes an enterprise level 1002, where a particular enterprise can be represented within data structured in accordance with a hierarchical data model. Beneath the enterprise level 1002 level can be a site level 1004, so that a particular factory (site) within an enterprise can be represented within a data packet. Beneath the site level 1004 an area level 1006 can exist, which specifies an area within the factory that relates to the data. A line level 1008 can lie beneath the area level 1006, wherein the line level 1008 is indicative of a line associated with particular data. Beneath the line level 1008 a workcell level 1010 can exist, thereby indicating a workcell associated with the data. Utilizing a nested, hierarchical data model, PLCs can become more aware of data associated therewith. Furthermore, the hierarchy 1000 can be customized by an owner of such hierarchy. For instance, more granular objects/levels can be defined within the hierarchy 1000.

Figure 11:
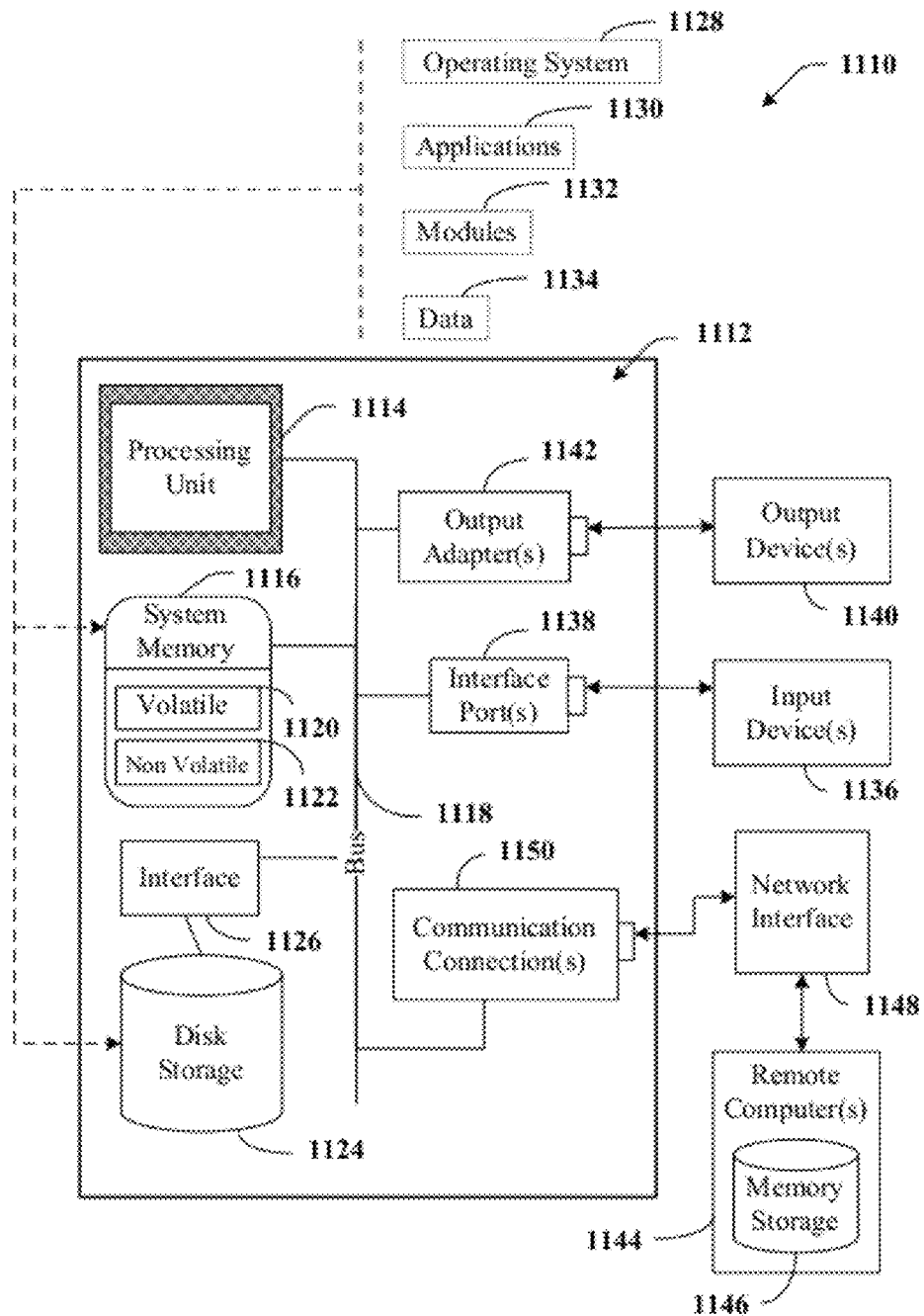
FIG. 11 is an example operating system upon which various features described herein can be implemented.

With reference to FIG. 11, an exemplary environment 1110 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

Figure 12:
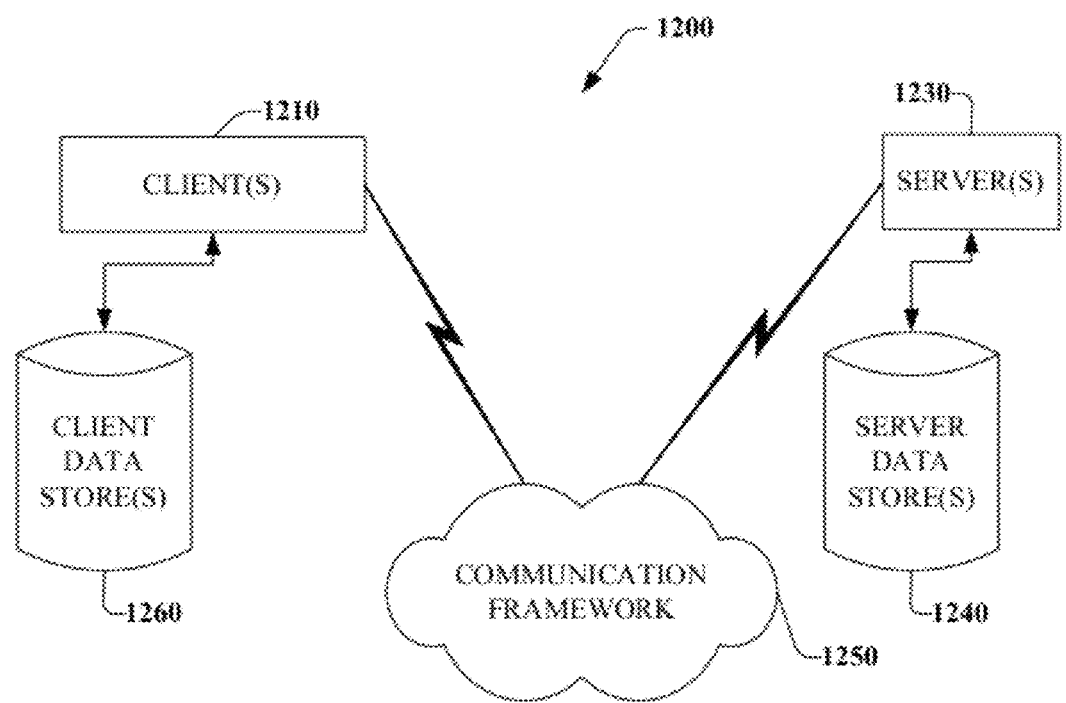
FIG. 12 is an exemplary computing environment within which various features described herein can interact.

FIG. 12 is a schematic block diagram of a sample-computing environment 1200 with which the subject invention can interact. The system 1200 includes one or more client(s) 1210. The client(s) 1210 can be hardware and/or software (e.g., threads, processes, computing devices). The system 1200 also includes one or more server(s) 1230. The server(s) 1230 can also be hardware and/or software (e.g., threads, processes, computing devices). The servers 1230 can house threads to perform transformations by employing the subject invention, for example. One possible communication between a client 1210 and a server 1230 can be in the form of a data packet adapted to be transmitted between two or more computer processes. The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for configuring state-based control, comprising:

an editor configured to create an object conforming to a hierarchically structured data model of an industrial system and to associate deployment data and lifecycle data with the object, the object configured to implement state-based control of an industrial system, wherein the deployment data comprises a deployment service and an associated deployment event, and the lifecycle data comprises one or more lifecycle states and associated one or more lifecycle events.

2. The system of claim 1, wherein the object is further configured to transition to a lifecycle state, of the one or more lifecycle states, in response to detection of a lifecycle event, of the one or more lifecycle events, corresponding to the lifecycle state.

3. The system of claim 2, wherein the object is further configured to deploy within a controller in response to detection of the deployment event, and wherein deployment of the object causes the controller to operate in accordance with a current lifecycle state of the object.

4. The system of claim 1, wherein the editor is further configured to submit an inquiry to a controller to determine at least one of a processing capability of the controller or a data format supported by the controller, and to map the object to the controller in accordance with the at least one of the processing capability or the data format.

5. The system of claim 1, further comprising a filtering component configured to selectively return objects for configuration based on at least one of a user identity, a location, or a current task.

6. The system of claim 1, wherein the lifecycle data includes a defined event that causes the at least one object to be de-commissioned.

7. The system of claim 1, wherein the editor includes a lifecycle state library configured to store selectable predefined lifecycle states and selectable predefined lifecycle events.

8. The system of claim 1, wherein the editor is further configured to allow access control for the object to be configured individually for the deployment data and the lifecycle data.

9. The system of claim 1, wherein the one or more lifecycle events correspond to at least one of a state of a process or a state of a machine within the industrial system.

10. The system of claim 1, further comprising a logging component configured to generate a log of configuration modifications applied to the object, wherein the log comprises at least one entry identifying a modification performed, a time of the modification, and an identification of a user who performed the modification.

11. A method for configuring an object that facilitate state-based control, comprising:
receiving first input for associating a deployment event with an object that performs state-based control of an industrial system, the object conforming to a hierarchically structured data model of the industrial system;
configuring the object, based on the receiving the first input, to deploy within a controller in response to detecting occurrence of the deployment event;
receiving second input for associating a lifecycle state and a corresponding lifecycle event with the object, wherein the lifecycle state corresponds to a control action; and
configuring the object, based on the receiving the second input, to transition to the lifecycle state in response to detecting occurrence of the lifecycle event.

12. The method of claim 11, further comprising:
querying the controller to determine whether the controller supports state-based control;
mapping the object to at least one program supportable by the controller in response to determining that the controller does not support state-based control; and
deploying the at least one program to the controller in response to detecting a state change associated with the program.

13. The method of claim 11, further comprising:
querying the controller to determine a type of network on which the controller resides; and
packaging the object to enable transmission over the type of network.

14. The method of claim 11, further comprising:
receiving a request to edit one or more objects; and
filtering the one or more objects based on at least one of a user identity or current location.

15. The method of claim 11, further comprising selecting the lifecycle state and the associated lifecycle event from a library of predefined lifecycle states and predefined lifecycle events.

16. The method of claim 11, further comprising configuring read access and write access to the object.

17. The method of claim 11, further comprising logging modifications performed on the object to yield a log file.

18. The method of claim 17, further comprising rolling the object back to a former configuration state based on an analysis of the log file.

19. A controller for implementing state-based control, comprising:
a processor;
a memory communicatively coupled to the processor, the memory having stored thereon computer-executable instructions configured to deploy a state-based object that conforms to a hierarchically structured data model representing an industrial system, the instructions comprising:
instructions to detect an alteration of a controlled process from a first state to a second state;
instructions to transition the state-based object to a lifecycle state corresponding to the second state in response to detection of the alteration, the lifecycle state selected in accordance with lifecycle data comprising the state-based object;
instructions to detect occurrence of a deployment event in the controlled process; and
instructions to deploy the state-based object in response to detection of the occurrence of the deployment event, wherein the deployment event is defined by deployment data comprising the state-based object.

20. The controller of claim 19, wherein deployment of the state-based object causes the controller to effect control of the controlled process in accordance with the lifecycle state.

* * * * *